(12) United States Patent
Bhargava et al.

(10) Patent No.: US 10,839,348 B2
(45) Date of Patent: Nov. 17, 2020

(54) SYSTEM AND METHOD FOR OPTIMIZING INVENTORY REPLENISHMENT

(71) Applicant: Wal-Mart Stores, Inc., Bentonville, AR (US)

(72) Inventors: Ankush Bhargava, Millbrae, CA (US); Bhavani Subramaniam, Foster City, CA (US); Sony Mangalassery Gregory, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 218 days.

(21) Appl. No.: 15/417,549

(22) Filed: Jan. 27, 2017

(65) Prior Publication Data
US 2018/0218322 A1 Aug. 2, 2018

(51) Int. Cl.
*G06Q 10/08* (2012.01)
*G06Q 30/06* (2012.01)

(52) U.S. Cl.
CPC ..... *G06Q 10/0875* (2013.01); *G06Q 30/0633* (2013.01)

(58) Field of Classification Search
CPC ...... G06Q 10/00; G06Q 20/00; G06Q 10/087; G06Q 10/0875
USPC ........................................ 705/28, 26.1, 7.36
See application file for complete search history.

(56) References Cited

U.S. PATENT DOCUMENTS

| | | | | |
|---|---|---|---|---|
| 6,123,259 A | * | 9/2000 | Ogasawara | G06K 17/0022 235/380 |
| 6,249,774 B1 | * | 6/2001 | Roden | G06Q 10/087 705/28 |
| 6,341,269 B1 | * | 1/2002 | Dulaney | G06Q 10/087 705/22 |
| 7,092,929 B1 | * | 8/2006 | Dvorak | G06Q 10/087 705/28 |
| 7,398,232 B2 | * | 7/2008 | Renz | G06Q 10/06 705/28 |
| 8,321,303 B1 | * | 11/2012 | Krishnamurthy | 705/28 |
| 8,620,716 B2 | * | 12/2013 | Nicholls | G06Q 10/10 705/7.29 |
| 2001/0047293 A1 | * | 11/2001 | Waller | G06Q 10/087 705/22 |
| 2002/0035537 A1 | * | 3/2002 | Waller | G06Q 10/087 705/37 |
| 2002/0072986 A1 | * | 6/2002 | Aram | G06Q 10/0637 705/7.36 |
| 2002/0072988 A1 | * | 6/2002 | Aram | G06Q 10/087 705/26.1 |

(Continued)

*Primary Examiner* — Oluseye Iwarere
(74) *Attorney, Agent, or Firm* — Bryan Cave Leighton Paisner LLP (57) ABSTRACT

A system, method, and computer product for optimizing inventory replenishment by a retailer. An inventory management system of a retailer includes an inventory management server and an inventory database. The inventory database includes data about a plurality of stock keeping units (SKUs) and configured to communicate with one or more vendor servers associated with one or more vendors. An automated replenishment system is communicatively coupled to the inventory management system. The automated replenishment system includes an automated replenishment server configured to determine that a first SKU of the plurality of SKUs is not replenishable.

20 Claims, 3 Drawing Sheets

(56) References Cited

U.S. PATENT DOCUMENTS

| | | | | |
|---|---|---|---|---|
| 2002/0174001 A1* | 11/2002 | Henry | G06Q 10/087 | 705/28 |
| 2003/0014314 A1* | 1/2003 | Griep | C23C 14/0623 | 705/15 |
| 2003/0033205 A1* | 2/2003 | Nowers | G06Q 30/06 | 705/26.2 |
| 2003/0078845 A1* | 4/2003 | Hoffman | G06Q 10/06 | 705/22 |
| 2003/0126103 A1* | 7/2003 | Chen | G06Q 10/06 | 706/50 |
| 2003/0136834 A1* | 7/2003 | Scheurer | G06Q 10/087 | 235/385 |
| 2003/0216969 A1* | 11/2003 | Bauer | G06K 7/0008 | 705/22 |
| 2004/0034581 A1* | 2/2004 | Hill | G06Q 10/087 | 705/28 |
| 2004/0186794 A1* | 9/2004 | Renz | G06Q 10/06 | 705/28 |
| 2004/0195309 A1* | 10/2004 | Wagner | B07C 7/005 | 235/375 |
| 2005/0049942 A1* | 3/2005 | Richard | G06Q 10/06 | 705/28 |
| 2005/0149414 A1* | 7/2005 | Schrodt, IV | G06Q 10/087 | 705/29 |
| 2005/0150951 A1* | 7/2005 | Sacco | G06Q 10/087 | 235/385 |
| 2005/0209732 A1* | 9/2005 | Audimoolam | G06Q 10/06 | 700/216 |
| 2005/0267791 A1* | 12/2005 | Lavoie | G06Q 10/04 | 705/7.31 |
| 2006/0004615 A1* | 1/2006 | Guldner | G06Q 10/00 | 705/7.11 |
| 2006/0020366 A1* | 1/2006 | Bloom | B07C 3/00 | 700/226 |
| 2006/0031148 A1* | 2/2006 | O'Dell | G06K 17/0022 | 705/28 |
| 2008/0086392 A1* | 4/2008 | Bishop | G06Q 10/08 | 705/28 |
| 2008/0133313 A1* | 6/2008 | Bateni | G06Q 10/04 | 705/7.31 |
| 2009/0063251 A1* | 3/2009 | Rangarajan | G06Q 10/06375 | 705/7.31 |
| 2009/0089143 A1* | 4/2009 | Bateni | G06Q 30/02 | 705/7.31 |
| 2009/0138384 A1* | 5/2009 | McCormick | G06Q 10/0637 | 705/28 |
| 2009/0187468 A1* | 7/2009 | Krech | G06Q 10/087 | 705/28 |
| 2010/0125489 A1* | 5/2010 | Surendra | G06Q 10/06 | 705/22 |
| 2010/0138037 A1* | 6/2010 | Adelberg | G06Q 10/087 | 700/241 |
| 2010/0153179 A1* | 6/2010 | Bateni | G06Q 30/02 | 705/7.31 |
| 2010/0161345 A1* | 6/2010 | Cain | G06F 19/328 | 705/2 |
| 2011/0047004 A1* | 2/2011 | Bateni | G06Q 10/04 | 705/7.31 |
| 2011/0054984 A1* | 3/2011 | Bateni | G06Q 10/087 | 705/7.31 |
| 2011/0246215 A1* | 10/2011 | Postma | G06Q 10/087 | 705/2 |
| 2012/0150700 A1* | 6/2012 | Babar | G06Q 10/08 | 705/28 |
| 2013/0144757 A1* | 6/2013 | Bauer | G06K 7/0008 | 705/26.61 |
| 2014/0122180 A1* | 5/2014 | Chan | G06Q 30/0202 | 705/7.31 |
| 2014/0156348 A1* | 6/2014 | Sinkel | G06Q 30/0605 | 705/7.31 |
| 2014/0278775 A1* | 9/2014 | Chan | G06Q 30/0202 | 705/7.31 |
| 2015/0032502 A1* | 1/2015 | Green | G06Q 20/203 | 705/7.29 |
| 2015/0032512 A1* | 1/2015 | Bateni | G06Q 30/0206 | 705/7.35 |
| 2016/0042147 A1* | 2/2016 | Maurer | G06F 19/3456 | 705/3 |
| 2016/0110733 A1* | 4/2016 | Ray | G06Q 30/0202 | 705/7.31 |
| 2017/0068973 A1* | 3/2017 | Sinkel | G06Q 30/0202 | |
| 2017/0300984 A1* | 10/2017 | Hurwich | G06Q 10/087 | |
| 2018/0150793 A1* | 5/2018 | Lert, Jr. | G06Q 10/06315 | |

\* cited by examiner

SYSTEM AND METHOD FOR OPTIMIZING INVENTORY REPLENISHMENT

BACKGROUND OF THE INVENTION

Field of the Invention

The present invention relates generally to inventory management for retailers and, more particularly, to a system for optimizing inventory replenishment and method of using same.

Description of the Related Art

It is known that online retailers have a number of products available for purchase by consumers, which may be held in fulfillment centers until ordered by customers. Each of these products is typically assigned a stock keeping unit (SKU). Of all available SKUs at any given time, a number of those SKUs may be considered "replenishable", meaning that the retailer expects an ongoing demand by customers for the products associated with the SKUs, and thus the retailer expects to continue purchasing the products from suppliers. In some instances, the number of replenishable SKUs may be only a fraction of all available SKUs, sometimes as low as approximately fifty percent.

Known inventory management systems lack efficiency in managing SKUs for large retailers that may have hundreds of thousands of SKUs in inventory at any one time. Accordingly, working capital is often tied up in managing SKUs that should no longer be considered replenishable for a variety of reasons, which is a waste of resources since sales for such SKUs are negligible or nonexistent.

There is a need for improved inventory management systems and methods to solve one or more of the above-identified problems.

SUMMARY OF INVENTION

Accordingly, the present invention provides systems, methods, and computer products configured to optimize inventory replenishment.

The present invention provides a computer system comprising an inventory management system and an automated replenishment system of a retailer. The inventory management system includes an inventory management server and an inventory database. The inventory database includes data about a plurality of stock keeping units (SKUs) and configured to communicate with one or more vendor servers associated with one or more vendors. The automated replenishment system is communicatively coupled to the inventory management system. The automated replenishment system includes an automated replenishment server configured to determine that a first SKU of the plurality of SKUs is not replenishable.

In addition, the present invention provides a method including the steps of providing an inventory management system of a retailer comprising an inventory management server and an inventory database, the inventory database including data about a plurality of stock keeping units (SKUs) and configured to communicate with one or more vendor servers associated with one or more vendors; and providing an automated replenishment system communicatively coupled to the inventory management system and comprising an automated replenishment server configured to determine that a first SKU of the plurality of SKUs is not replenishable.

Further, the present invention provides one or more non-transitory computer-readable storage media, having computer-executable instructions embodied thereon, wherein when executed by at least one processor, the computer-executable instructions cause the processor to evaluate data from an inventory database of an inventory management server about a first stock keeping unit (SKU) of a plurality of SKUs, and determine, based on the evaluation of the data, that the first SKU is not replenishable.

Other features and advantages of the present invention will be readily appreciated, as the same becomes better understood, after reading the subsequent description taken in conjunction with the accompanying drawings.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

With reference to the figures and in operation, the present invention provides a system 100 and methods and computer product media that facilitate systematically identifying and managing unproductive SKUs of a retailer.

Figure 1:
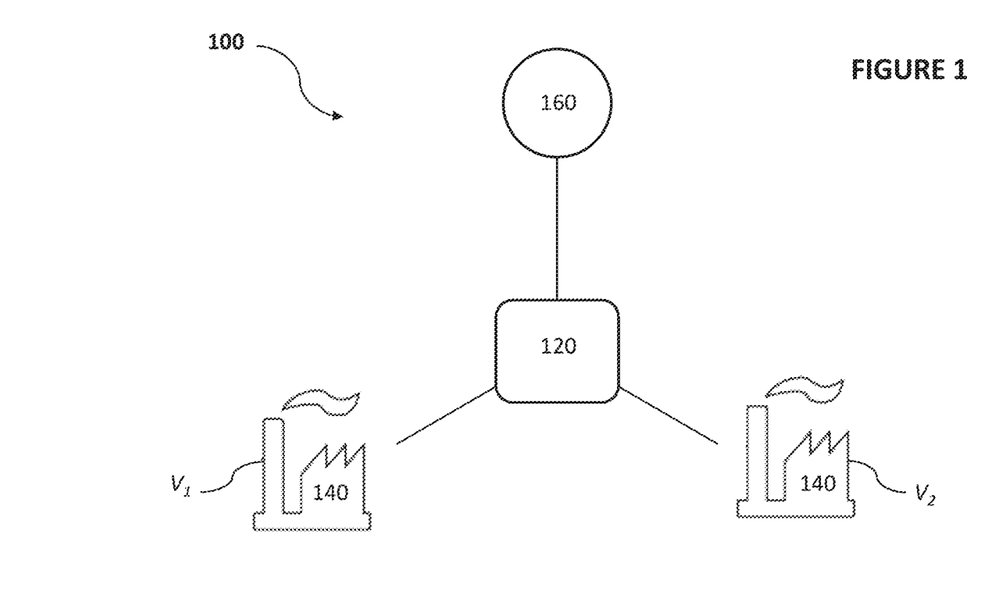
FIG. 1 is a diagrammatic view of a system to optimize inventory replenishment, according to one embodiment of the present invention.

Referring to FIG. 1, an exemplary environment in which a system 100 incorporating an inventory management system 120, according to the present invention, is illustrated.

System 100 is configured for a large retailer having one or more vendors 140 who supply one or more items to the retailer. Vendors may include drop ship suppliers as well as marketplace sellers. In the example illustrated in FIG. 1, the large retailer has two vendors 140 ($V_1$, $V_2$). Each vendor 140 may have a vendor pack quantity (VPQ) and minimum order quantity (MOQ) for each product to be ordered by the retailer. System 100 may include an automated replenishment system 160 to order a quantity of product(s) from a vendor 140. Inventory management system 120 resides on a computer network system (see FIG. 2) of the large retailer that communicates with vendors 140 and automated replenishment system 160. It should be appreciated that system 100 illustrated in FIG. 1 is not intended to limit the scope of the present invention. It should further be appreciated that automated replenishment system 160 may be used with various other types of systems 100, not specifically shown herein, without departing from the scope of the present invention.

For clarity in discussing the various functions of system 100, multiple computers and/or servers are discussed as performing different functions. These different computers (or servers) may, however, be implemented in multiple different ways such as modules within a single computer, as nodes of a computer system, etc. The functions performed by system 100 (or nodes or modules) may be centralized or distributed in any suitable manner across system 100 and its components, regardless of the location of specific hardware. Furthermore, specific components of system 100 may be referenced using functional terminology in their names. The function terminology is used solely for purposes of naming convention and to distinguish one element from another in the following discussion. Unless otherwise specified, the name of an element conveys no specific functionality to the element or component.

Figure 2:
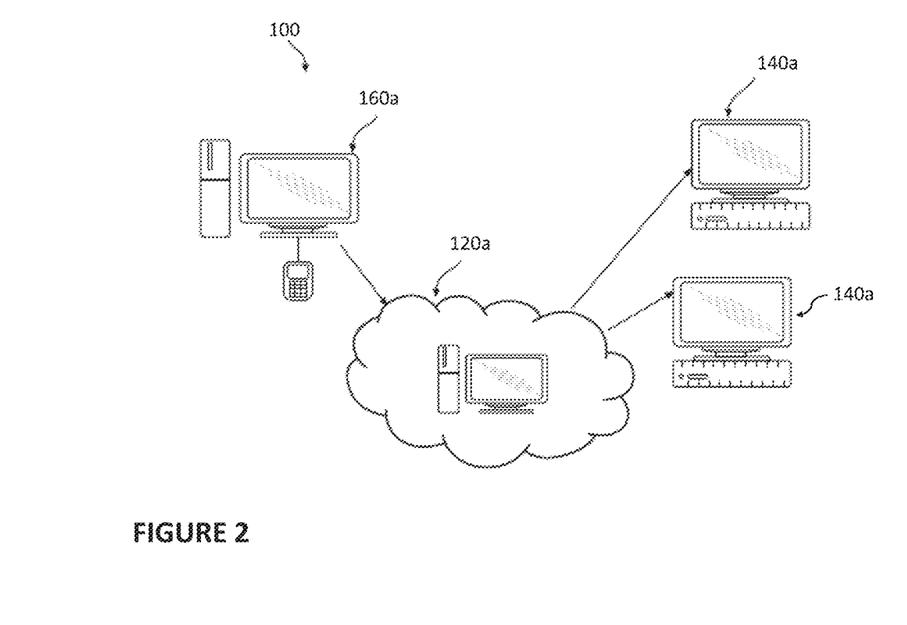
FIG. 2 is another diagrammatic view of the system of FIG. 1.

With specific reference to FIG. 2, system 100 may include an associated first server or inventory management system server 120a. Inventory management system server 120a may include a computer having a memory, a processor, a display and user input mechanism. Inventory management system server 120a may include an inventory database for storing information about a plurality of SKUs (e.g., generic name, brand name, color, size, style, price, manufacturer, VPQ assigned by vendor, MOQ assigned by vendor, and any other pertinent data) or be coupled to a database to access information. The database may further include information about purchase/fulfillment history for each of the plurality of SKUs between the retailer and one or more vendors (e.g., purchase orders and receipts, purchase order cancellations, fulfillment rates, etc.). The database may further include information about demand for each of the plurality of SKUs by customers. Inventory management system server 120a is configured to optimize inventory replenishment to be subsequently described.

System 100 may also include or have an associated second server or vendor server 140a associated with each vendor 140. Vendor server 140a is coupled to inventory management system server 120a for receiving executable purchase orders from inventory management system 120. Vendor server 140a may include a database for storing information about a vendor's inventory (e.g., stock on hand of a particular SKU). Vendor server 140a also allows a vendor 140 to interact with inventory management system server 120a to input information about each SKU, e.g., VPQ and MOQ. It should be appreciated that vendor server 140a may include the same or similar components as inventory management system server 120a.

System 100 may include or have an associated third server or automated replenishment system server 160a associated with automated replenishment system 160. Automated replenishment system server 160a is coupled to inventory management system server 120a for allowing information to be input into inventory management system 120. It should be appreciated that the automated replenishment server 160a may include the same or similar components as inventory management system server 120a.

Referring to FIG. 2, in selected embodiments, software, hardware, and associated components of system 100 may be programmed and configured to implement one or more embodiments described herein. System 100 may communicate with the servers 12a, 14a, and 16a via a communications device or a communications connection or network. The communications connection may be any suitable connection, including the Internet, file transfer protocol (FTP), an Intranet, LAN, a virtual private network (VPN), cellular networks, etc., and may utilize any suitable or combination of technologies including, but not limited to wired and wireless connections, always on connections, connections made periodically, and connections made as needed. It should be appreciated that the communications device may include any suitable device, including, but not limited to, a desktop computer, a laptop or notebook computer, a tablet, a handheld mobile device including a cellular telephone, and the like. It should also be appreciated that the various aspects of system 100 may be exemplified as software, modules, nodes, etc., of a computer or server.

Figure 3:
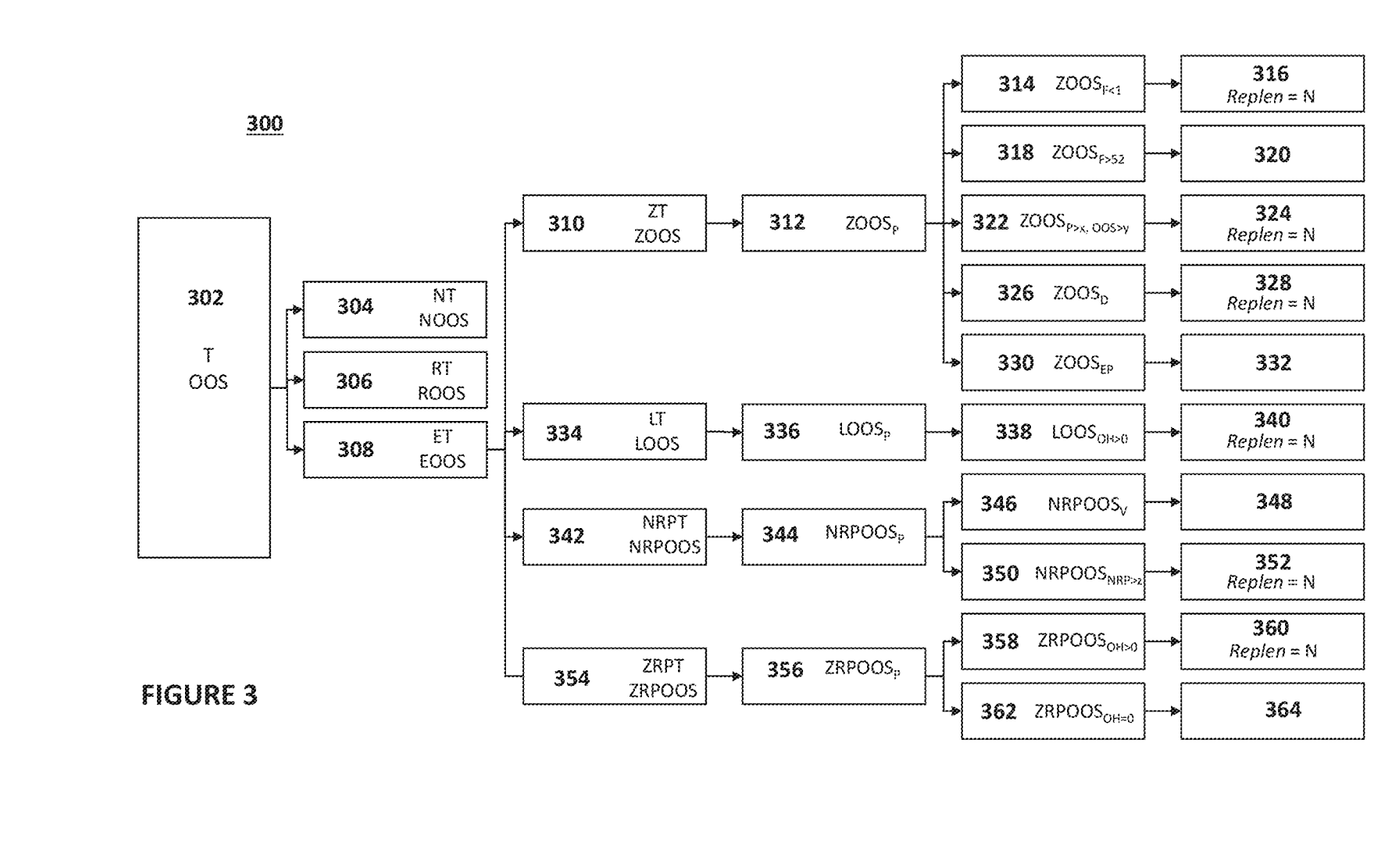
FIG. 3 is a flowchart illustrating a method for optimizing inventory replenishment, using the system of FIGS. 1-2.

Referring now to FIG. 3, a flowchart illustrating a method 300 for optimizing replenishment of inventory using the system of FIGS. 1-2 is shown. At step 302 of method 300, a total number of all stock keeping units (SKUs) of a retailer is identified (T), and of T SKUs, a number of out-of-stock SKUs is additionally identified (OOS). As used herein, "SKU" refers to a specific product sold by a retailer. Each SKU may be represented as a number, a machine-readable code (e.g., a barcode), or any other unique identifier.

At step 304 of method 300, T is evaluated to determine how many of the SKUs are new SKUs (NT), and of NT SKUs, a number of out-of-stock new SKUs is additionally identified (NOOS). As used herein, "new" can be defined by the retailer to include all SKUs recently added by the retailer to the inventory management system 120 within a certain time period, e.g., 6 months. Because the SKUs are new to the system, it may be assumed that not enough time has passed to determine whether an SKU is replenishable. Accordingly, no further action is taken with respect to NT and NOOS SKUs.

At step 306 of method 300, T is evaluated to determine how many of the SKUs have already been recognized as replenishable SKUs (RT), and of RT SKUs, a number of out-of-stock replenishable SKUs is additionally identified (ROOS). The criteria used to identify an SKU as "replenishable" may be defined by the retailer. Because the SKUs have already been identified as replenishable, the system will continue to replenish RT and ROOS SKUs on an as-needed basis.

At step 308 of method 300, T is evaluated to determine how many of the SKUs are defined neither as NT or RT, or exception SKUs (ET), and of exception SKUs, a number of out-of-stock exception SKUs is additionally identified (EOOS). Further evaluation of ET and EOOS SKUs is then performed to identify and, in some cases, remove unproductive SKUs from inventory management system 120. A variety of exit criteria may be evaluated, including, for example: demand forecast, historical in-stock rates, vendor fill rates, multi-channel availability, and vendor inputs.

At step 310, all ET SKUs are evaluated to identify a total number of SKUs with a zero-fill rate (ZT), and of ZT SKUs, a number of out-of-stock zero-fill SKUs is additionally identified (ZOOS). The criteria used to identify an SKU as "zero-fill" may be defined by the retailer. For example, a SKU may be considered "zero-fill" if the past three purchase orders were not filled by the vendor from which the SKU was ordered by the retailer, i.e., no inventory was received by the retailer.

At step 312, ZOOS SKUs are evaluated to identify all SKUs that have been out-of-stock for more than a predetermined period of time, e.g., 7 days ($ZOOS_P$).

At step 314, $ZOOS_P$ SKUs are evaluated to identify all SKUs for which a 52-week forecast (F) for ordering the SKU is less than 1 unit ($ZOOS_{F<1}$). At step 316, for each $ZOOS_{F<1}$ SKU, the system automatically determines that the SKU will not be replenished (Replen=N).

At step 318, $ZOOS_P$ SKUs are evaluated to identify all SKUs for which F is greater than 52 units, i.e., 1 unit per week ($ZOOS_{F>52}$). At step 320, all $ZOOS_{F>52}$ SKUs may be marked for further review by the retailer. For example, the retailer may wish to review fill rates with the vendor to determine whether the SKU should be identified in the inventory management system 120 as replenishable, which may depend, for example, on the vendor's VPQ and MOQ for the SKU.

At step 322, $ZOOS_P$ SKUs are evaluated to identify all SKUs for which the retailer has not received inventory for longer than a predetermined period of time x, e.g., 6 months, and the SKU has been out-of-stock for longer than a predetermined period of time y, e.g., 60 days ($ZOOS_{P>x, OOS>y}$). At step 324, for each $ZOOS_{P>x, OOS>y}$ SKU, the system automatically determines that the SKU will not be replenished (Replen=N).

At step 326, $ZOOS_P$ SKUs are evaluated to identify all SKUs that have been marked as discontinued by the vendor ($ZOOS_D$). At step 328, for each $ZOOS_D$ SKU, the system automatically determines that the SKU will not be replenished (Replen=N).

At step 330, $ZOOS_P$ SKUs are evaluated to identify all SKUs that have been out-of-stock for more than an extended predetermined period of time, e.g., 30 days ($ZOOS_{EP}$). At step 332, for each $ZOOS_{EP}$ SKU, the system places the SKU on hold such that replenishment of the SKU will not resume until some manual action is taken by the retailer.

At step 334, all ET SKUs are evaluated to identify a total number of SKUs with a low-fill forecast (LT), and of LT SKUs, a number of out-of-stock LT SKUs is additionally identified (LOOS). The criteria used to identify an SKU as "low-fill" may be defined by the retailer. For example, a SKU may be considered "low-fill" if F<1 unit, VPQ>26 weeks of supply, and the SKU is available from a backup channel such as a drop-ship supplier or marketplace seller.

At step 336, LOOS SKUs are evaluated to identify all SKUs that have been out-of-stock for more than a predetermined period of time, e.g., 7 days ($LOOS_P$).

At step 338, $LOOS_P$ SKUs are evaluated to identify all SKUs for which a backup channel (e.g., a drop-ship supplier or marketplace seller) has greater than 0 SKUs on hand ($LOOS_{OH>0}$). At step 340, for each $LOOS_{OH>0}$ SKU, the system automatically determines that the SKU will not be replenished (Replen=N).

At step 342, all ET SKUs are evaluated to identify a total number of SKUs with a reorder point of −1 (NRPT), and of NRPT SKUs, a number of out-of-stock NRPT SKUs is additionally identified (NRPOOS). A reorder point, as used herein, is defined as the threshold below which a SKU must be replenished to maintain sufficient inventory to meet expected demand. The criteria used give a SKU a reorder point as "−1" may be defined by the retailer. For example, a SKU may be given a reorder point of "−1" if F<1 unit and no backup channels exist for ordering the SKU (e.g., a drop-ship supplier or marketplace seller), or if the system otherwise has not recommended replenishment of the SKU.

At step 344, NRPOOS SKUs are evaluated to identify all SKUs that have been out-of-stock for more than a predetermined period of time, e.g., 7 days (NRPOOS$_P$).

At step 346, NRPOOS$_P$ SKUs are evaluated to identify all SKUs that have a number of website product page views by customers that exceed a predefined threshold within a predetermined period of time, which may be set by the retailer (NRPOOS$_V$). At step 348, NRPOOS$_V$ SKUs may be marked for further review by the retailer. For example, the retailer may wish to review demand forecast to determine whether the SKU should be identified in the inventory management system 120 as replenishable.

At step 350, NRPOOS SKUs are evaluated to identify all SKUs that have had a reorder point set at "−1" for longer than a predetermined period of time z, e.g., 30 days (NRPOOS$_{NRP>z}$). At step 352, for each NRPOOS$_{NRP>z}$ SKU, the system automatically determines that the SKU will not be replenished (Replen=N).

At step 354, all ET SKUs are evaluated to identify a total number of SKUs with a reorder point of 0 (ZRPT), and of ZRPT SKUs, a number of out-of-stock ZRPT SKUs is additionally identified (ZRPOOS). The criteria used give a SKU a reorder point as "0" may be defined by the retailer. For example, a SKU may be given a reorder point of "0" if F<1 unit, VPQ>26 weeks of supply, and the stockout cost (i.e., economic consequences of failing to meet demand for the SKU) is greater than the cost of replenishing the SKU.

At step 356, ZRPOOS SKUs are evaluated to identify all SKUs that have been out-of-stock for more than a predetermined period of time, e.g., 7 days (ZRPOOS$_P$).

At step 358, ZRPOOS$_P$ SKUs are evaluated to identify all SKUs for which a backup channel (e.g., a drop-ship supplier or marketplace seller) has greater than 0 SKUs on hand (ZRPOOS$_{OH>0}$). At step 360, for each ZRPOOS$_{OH>0}$ SKU, the system automatically determines that the SKU will not be replenished (Replen=N).

At step 362, ZRPOOS$_P$ SKUs are evaluated to identify all SKUs for which all backup channels (e.g., drop-ship suppliers and marketplace sellers) have 0 SKUs on hand (ZRPOOS$_{OH=0}$). At step 364, ZRPOOS$_{OH=0}$ SKUs may be marked for further review by the retailer. For example, the retailer may wish to review the SKU with the vendor demand forecast to determine whether the SKU should be identified in the inventory management system 120 as replenishable, which may depend, for example, on the monetary impact to the retailer of electing not to replenish the SKU based on the vendor's VPQ for the SKU.

Exemplary scripts for executing various steps of method 300 are reproduced below. The exemplary scripts are intended for illustrative purposes only and are not intended to limit the scope of the present invention. It should further be appreciated that the below scripts may be altered without departing from the scope of the present invention.

Setting up libraries:
```
library('RMySQL')
library('RPostgreSQL')
library('dplyr')
library('tidyr')
library('data.table')
library('stringr')
# source('queryHive.R')
# source("Config.R")
Setting up configs to access inventory and forecast data:
dbConnect(MySQL( ),
    user="spf_root",
    password="pw",dbname="forecasting",
    host="spf-db.sv.walmartlabs.com")
dbConnect(PostgreSQL( ),
    user="smrt_repl_rt",
    password="pw2",dbname="smart replenishmentproduction",
    host="sims-wf-db.sv.walmartlabs.com")
dbConnect(MySQL( ),
    user="spf_root",
    password="pw3",dbname="sims",
    host="smrtalloc-pdb.sv.walmartlabs.com")
dbConnect(PostgreSQL( ),
    user="smrt_repl_rt",
    password="pw4",
        dbname="smart_replenishment_staging",
    host="sims-wf-db-dev.sv.walmartlabs.com")
Query for pulling all data about SKU including 6-month forecast, VPQ, end dates and clearance pricing:
    postgres_query<-"select   a.*,sr.order_point,   sr.impor-
        t_item,
    sr. order_upto,sr. order_qty,sr. expected_on_hand_units,
        sr. order_flag,sr.gen_date,
    sr. safety stock, --(a.vendor_pack_qty/a.six_month_total_
        forecast) as
    vendor_pk_wos,
    (case when a.six_month_total_forecast>0 then
    a.vendor_pack_qty/a.six_month_total_forecast  else  0
        end) as vendor_pk_wos,
    (case when end_date<=current date then 1 else 0 end) as
        end_date_in_past,
    oh.total_oh as Owned_inv, current_date as report_date
    from (select*from stocking_recommendations where
        import_item=0) sr left join
    (select f.item_id, f.channel, u.vendor_pack_qty, u.inv_
        type, u.price_change_desc,
    cast(u.start_date as varchar), u.end_date, f.velocity_clas-
        sification,
    u.avail_code,u.display_status_desc,   u.subcat,   u.cat,
        u.dept, u.super_dept,u.division,
    u.upc, u.avg_cost, u.list_price, u.item_name, u.vendor_
        name,
    u.buy_in,sum(f.forecast_final_qty*f.own_pct) as  six_
        month_total_forecast
    from   daily_item_forecasts   f,   uber_data   u   where
        f.item_id=u.item_id and
    date_part('day',week_start_date::timestamp−forecast_
        start_week::timestamp)<182 and
    u.is_replen=1 group by f.item_id, f.channel, u.vendor_
        pack_qty, u.inv_type,
    u.price_change_desc, u.start_date, u.end_date,
    f.velocity_classification, u.avail_code,
    u.display_status_desc, u.subcat, u.cat, u.dept, u.super_
        dept,u.division,
    u.upc, u.avg_cost, u.list_price, u.item_name, u.vendor_
        name, u.buy_in
    ) a on sr.item_id=a.item_id
    left join (select item_id, sum(total_oh) as total_oh from
        daily_item_on_hand_no_dc
    where report_date=current_date group by item_id) oh on
        sr.item_id=oh.item_id"
```

Postgres_data<-dbGetQuery(Replen, postgres_query)

Query for pulling all marketplace (MP) and drop-ship vendor (DSV) in stock:

```
mp_dsv_inv<-queryHive("select q.item_id as item_id,
    sum(q.qty_in_stock) as
dsv_mp_on_hand from walmart_us_dotcom.inventory_
    qty_in_stock
q,walmart_us_dotcom.uber_item_info i
    where q.item_id=i.catalog_item_id and i.is_replen='Y'
    and q.distributor_id not in
    (2622, 2623, 2624, 2377, 2378, 2379, 2380, 7622,
        7628, 4900, 5926, 8302, 2635, 2381, 2382, 2383,
        2384, 4916, 5868, 6559, 3373, 77628, 511873057,
        9719, 4364, 4401, 5989, 6761, 6763, 6767, 6775, 6776,
        3559, 2698, 2707, 2709, 2738, 2746, 2750, 8306,
        6906, 6908, 6913, 6918, 6954, 6992, 511873055,
        511873054, 511873056, 466741, 511873053, 803554,
        511873052, 824755) group by item_id")
```

Query for pulling SKUs with last 3 purchase orders closed or cancelled with 0 receipts:

```
po_exceptions<-"
select u.item_id as item_id,
a.upc, count(po_status), sum(receipt), max(week) as last_
    attempted_mabd, 1 as
Last_3_po_cancelled
from
(
SELECT upc,week,po_status,receipt, rn
FROM
(SELECT isc.upc,
    cast((cast(date_part('year',isc.mabd) as text)||cast
        (date_part('week',isc.mabd) as text)) as text) as week,
    isc.po_status, sum(isc.received_qty) as receipt,
    ROW_NUMBER( ) OVER (PARTITION BY isc.upc
        ORDER BY isc.upc,
    cast((cast(date_part('year',isc.mabd) as text)||cast
        (date_part('week',isc.mabd) as text)) as text)
    DESC)AS rn
FROM isc_po_detail isc, uber_data u
where isc.upc=u.upc and u.is_replen=1 and
    isc.mabd<current_date group by isc.upc, cast((cast
    (date_part('year',isc.mabd) as text)||cast(date_part
    ('week',isc.mabd) as text)) as text),
    isc.po_status) tmp
WHERE rn<=3--and upc='1258770403'
ORDER BY upc,week,po_status, receipt) a, uber_data u
    where a.upc=u.upc
group by u.item_id,a.upc
having count(po_status)=3 and
sum(receipt)=0"
Last_3_po<-dbGetQuery(Replen, po_exceptions)
last_sales_receipt<-"select sr.item_id, receipts.last_re-
    ceipt_date, sales.last_sales_date
from (select*from stocking_recommendations where
    import_item=0) sr
left join
(select r.item_id, max(r.date_received) as last_receipt_
    date from receipts_data r,
stocking_recommendations sr where sr.item_id=r.item_id
    and sr.import_item=0
group by r.item_id) receipts on
    sr.item_id=receipts.item_id
left join
(select s.item_id, max(s.report_date) as last_sales_date
    from sales_item_no_dc s,
stocking_recommendations sr where sr.item_id=s.item_id
    and sr.import_item=0
group by s.item_id) sales on sr.item_id=sales.item_id"
Last_sales_receipts_data<-dbGetQuery(Replen, last_
    sales_receipt)
```

Query for pulling number of SKUs in last 90 days that SKU had reorder point=-1:

```
negative_order_pt_query<-"select item_id, count(gen_
    date) as days_neg_order_point
from replenishment.stocking_recommendations_history
    where order_point=-1 and
import_item=0 and cast(gen_date as date)>=
date_sub(from_unixtime(unix_timestamp( ),90) group by
    item_id"
negative_order_pt last90days<-queryHive(negative_or-
    der_pt_query)
```

Query for pulling day when SKU was last available:

```
last_available_day_query<-"select item_id, max(cast(ds
    as date)) as last_in_stock_day
from        spf.uber_data_forecasting         where
    avail_code='AVAILABLE' and cast(ds as date)
    >=date_ sub(from_unixtime(unix_timestamp( ),90)
    group by item_id"—id"
last_available_day<-queryHive(last_available_day_
    query)
```

Query for pulling vendor availability status:

```
unavailable_at_vendor_query<-"SELECT    DISTINCT
    item_id, 'not available at vendor'
AS vendor_availability_status FROM item_availabili-
    ty_statuses                                WHERE
    status_type='not_available_at_vendor'        AND
    curdate( )>start_DATE AND curdate( )<end_date"
vendor_availability_status<-dbGetQuery(SIMS, unavail-
    able_at_vendor_query)
```

Query for merging two datasets:

```
first_2_dfs_merge<-merge(Postgres_data,mp_dsv_inv,
    by="item_id", all.x=TRUE)
first3_dfs_merge<-merge(x=first_2_dfs_merge,
    y=Last_3_po,by="item_id",
all.x=TRUE)
first3_dfs_merge$upc.y<-NULL
first3_dfs_merge$count<-NULL
first3_dfs_merge$sum<-NULL
order_point_dims<-"select sr.item_id, 1 as order_
    point_zero from
stocking_recommendations sr where sr.order_point=0
    and sr.import_item=0"
negative_order_pt_query<-"select sr.item_id, 1 as nega-
    tive_order_pt from
stocking_recommendations sr where sr.order_point=-1
    and sr.import_item=0"
order_point_dims_query<-dbGetQuery(Replen, order_
    point_dims)
negative_order_pt<-dbGetQuery(Replen, negative_or-
    der_pt_query)
full_data_set1<-
merge(first3_dfs_merge,order_point_dims_query,
    by="item_id",all.x=TRUE)
full_data_set1<-merge(full_data_set1,negative_order_pt,
    by="item_id",all.x=TRUE)
full_data_set1<-merge(full_data_set1,last_available_day,
    by="item_id",all.x=TRUE)
full_data_set1[is.na(full_data_set1)]
full_data_set2<-
merge(full_data_set1,Last_sales_receipts_data,
    by="item_id",all.x=TRUE)
full_data_set3<-
merge(full_data_set2,vendor_availability_status,
    by="item_id",all.x=TRUE)
``` full data set<-
merge(full_data_set3,negative order_pt_last90days, by="item_id",all.x=TRUE)
    # full_data_set<-merge(x=first_2_dfs_merge, y=Last_3_po[,c("item_id")],by="item_id", all.x=TRUE)

Query to add column to flag low forecast SKUs with inventory at MP or DSV:

full_data_set$low_forecast_available_dsv_mp<-
ifelse(full_data_set$six_month_total_forecast<2 & full_data_set$dsv_mp_on_hand>0, 1, 0)
    # write.csv(full_data_set,"intend to replen.csv")

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system comprising:
an inventory management system of a retailer comprising an inventory management server and an inventory database, the inventory database comprising first data for a plurality of stock keeping units (SKUs), wherein the plurality of SKUs comprises (i) new SKUs, wherein the new SKUs are added to the inventory management system within a predetermined period of time without being identified as replenishable, (ii) replenishable SKUs, wherein the replenishable SKUs are identified as replenishable and wherein the inventory management system is configured to automatically replenish a respective stock of each respective replenishable SKU of the replenishable SKUs, and (iii) exception SKUs that are defined as neither a new SKU nor a replenishable SKU, wherein at least a portion of the plurality of SKUs are identified as out-of-stock in the inventory database, and wherein the inventory management server is configured to communicate with one or more vendor servers associated with one or more vendors; and
an automated replenishment system in data communication with the inventory management system, wherein the automated replenishment system is configured (i) to automatically replenish a stock of a first SKU of the plurality of SKUs that was previously identified as one of the replenishable SKUs based on an on-going demand for the first SKU and (ii) to automatically determine that the first SKU is out-of-stock, wherein an automated replenishment server of the automated replenishment system is configured to evaluate whether a forecast for the first SKU is below a predetermined forecast for a period of time, wherein, when the automated replenishment server determines that the forecast for the first SKU of the plurality of SKUs is below the predetermined forecast during the period of time, the automated replenishment system is further configured to identify an inventory of the first SKU as not replenishable, and wherein, when the inventory of the first SKU is identified as not replenishable for the period of time, the inventory of the first SKU is not automatically replenished for the period of time based on at least the predetermined forecast.

2. The system of claim 1, wherein:
each of the plurality of SKUs is assigned a respective minimum order quantity (MOQ) and a respective vendor pack quantity (VPQ) by the one or more vendors; and
the respective MOQ and the respective VPQ for each SKU of the plurality of SKUs is stored in the inventory database.

3. The system of claim 2, wherein the automated replenishment system is further configured to evaluate second data from the inventory database about the first SKU before identifying that the inventory of the first SKU is not replenishable for the period of time, and wherein the second data is a subset of the first data.

4. The system of claim 1, wherein the automated replenishment system is further configured to evaluate second data from the inventory database about a second SKU of the plurality of SKUs and identify that an inventory of the second SKU is replenishable, and wherein the second data is a subset of the first data.

5. The system of claim 4, wherein the automated replenishment system is further configured to communicate to the inventory management server that the inventory of the second SKU is replenishable.

6. The system of claim 5, wherein the inventory management server automatically communicates an order for the second SKU to the one or more vendor servers when a stock of the second SKU falls below a predetermined reorder point associated with the second SKU.

7. The system of claim 1, wherein the automated replenishment system is further configured to:
evaluate third data from the inventory database about a third SKU of the plurality of SKUs, wherein the third data is a subset of the first data; and
flag the third SKU for a manual review of the third data from the inventory database associated with the third SKU.

8. The system of claim 7, wherein, following the manual review of the third data from the inventory database about the third SKU, an inventory of the third SKU is identified to be non-replenishable, wherein the third data is a subset of the first data.

9. The system of claim 7, wherein, following manual review of the third data from the inventory database about the third SKU, an inventory of the third SKU is identified to be replenishable, wherein the third data is a subset of the first data.

10. A method comprising:
providing an inventory management system of a retailer comprising an inventory management server and an inventory database, the inventory database comprising first data for a plurality of stock keeping units (SKUs), wherein the plurality of SKUs comprises (i) new SKUs, wherein the new SKUs are added to the inventory management system within a predetermined period of time without being identified as replenishable, (ii) replenishable SKUs, wherein the replenishable SKUs are identified as replenishable and wherein the inventory management system is configured to automatically replenish a respective stock of each respective replenishable SKU of the replenishable SKUs, and (iii) exception SKUs that are defined as neither a new SKU or a replenishable SKU, wherein at least a portion of the plurality of SKUs are identified as out-of-stock in the inventory database, and wherein the inventory management server is configured to communicate with one or more vendor servers associated with one or more vendors; and providing an automated replenishment system is in data communication with the inventory management system, wherein the automated replenishment system is configured (i) to automatically replenish a stock of a first SKU of the plurality of SKUs that was previously identified as one of the replenishable SKUs based on an on-going demand for the first SKU and (ii) to automatically determine that the first SKU is out-of-stock, wherein an automated replenishment server of the automated replenishment system is configured to evaluate whether a forecast for the first SKU is below a predetermined forecast for a period of time, wherein, when the automated replenishment server determines that the forecast for the first SKU of the plurality of SKUs is below the predetermined forecast during the period of time, the automated replenishment system is further configured to identify an inventory of the first SKU as not replenishable, and wherein, when the inventory of the first SKU is identified as not replenishable for the period of time, the inventory of the first SKU is not automatically replenished for the period of time based on at least the predetermined forecast.

11. The method of claim 10, wherein each of the plurality of SKUs is assigned a respective minimum order quantity (MOQ) and a respective vendor pack quantity (VPQ) by the one or more vendors; and
the respective MOQ and the respective VPQ for each SKU of the plurality of SKUs is stored in the inventory database.

12. The method of claim 11, further comprising:
evaluating, by the automated replenishment system, second data from the inventory database about the first SKU before identifying that the inventory of the first SKU is not replenishable for the period of time, and wherein the second data is a subset of the first data.

13. The method of claim 10, further comprising:
evaluating, by the automated replenishment system, second data from the inventory database about a second SKU of the plurality of SKUs and identify that an inventory of the second SKU is replenishable, and wherein the second data is a subset of the first data.

14. The method of claim 13, further comprising:
communicating, by the automated replenishment system to the inventory management server, that the inventory of the second SKU is replenishable.

15. The method of claim 14, further comprising:
automatically communicating, by the inventory management server to the one or more vender servers, an order for the second SKU when stock of the second SKU falls below a predetermined reorder point associated with the second SKU.

16. The method of claim 11, further comprising:
evaluating, by the automated replenishment system, the third data from the inventory database about a third SKU of the plurality of SKUs, wherein the third data is a subset of the first data; and
flagging, by the automated replenishment system, the third SKU for a manual review of the third data from the inventory database associated with the third SKU.

17. The method of claim 16, further comprising, following the manual review of the third data from the inventory database the third SKU, identifying that an inventory of the third SKU is non-replenishable, wherein the third data is a subset of the first data.

18. The method of claim 16, further comprising, following the manual review of the third data from the inventory database associated with the third SKU, identifying that an inventory of the third SKU is replenishable, wherein the third data is a subset of the first data.

19. The method of claim 18, further comprising:
automatically communicating, by the inventory management server to the one or more vender servers, an order of the third SKU when stock of the third SKU falls below a predetermined reorder point associated with the third SKU.

20. One or more non-transitory computer-readable storage media, having computer-executable instructions embodied thereon, wherein when executed by at least one processor, the computer-executable instructions cause the processor to:
providing an inventory management system of a retailer comprising an inventory management server and an inventory database, the inventory database comprising first data for a plurality of stock keeping units (SKUs), wherein the plurality of SKUs comprises (i) new SKUs, wherein the new SKUs are added to the inventory management system within a predetermined period of time without being identified as replenishable, (ii) replenishable SKUs, wherein the replenishable SKUs are identified as replenishable and wherein the inventory management system is configured to automatically replenish a respective stock of each respective replenishable SKU of the replenishable SKUs, and (iii) exception SKUs that are defined as neither a new SKU or a replenishable SKU, wherein at least a portion of the plurality of SKUs are identified as out-of-stock in the inventory database, and wherein the inventory management server is configured to communicate with one or more vendor servers associated with one or more vendors; and
providing an automated replenishment system is in data communication with the inventory management system, wherein the automated replenishment system is configured (i) to automatically replenish a stock of a first SKU of the plurality of SKUs that was previously identified one of the replenishable SKUs based on an on-going demand for the first SKU and (ii) to automatically determine that the first SKU is out-of-stock, wherein an automated replenishment server of the automated replenishment system is configured to evaluate whether a forecast for the first SKU is below a predetermined forecast for a period of time, wherein, when the automated replenishment server determines that the forecast for the first SKU of the plurality of SKUs is below the predetermined forecast during the period of time, the automated replenishment system is further configured to identify an inventory of the first SKU as not replenishable, and wherein, when the inventory of the first SKU is identified as not replenishable for the period of time, the inventory of the first SKU is not automatically replenished for the period of time based on at least the predetermined forecast.

* * * * *